(12) United States Patent
Miguez et al.

(10) Patent No.: US 9,016,109 B1
(45) Date of Patent: Apr. 28, 2015

(54) PACKING LEAK DETECTION SYSTEM

(75) Inventors: John P. Miguez, Lafayette, LA (US); Jonathan D. Mann, Lafayette, LA (US)

(73) Assignee: M-Squared Products & Services, Inc., Lafayette, LA (US)

( * ) Notice: Subject to any disclaimer, the term of this patent is extended or adjusted under 35 U.S.C. 154(b) by 528 days.

(21) Appl. No.: 13/204,659

(22) Filed: Aug. 6, 2011

(51) Int. Cl.
*G01M 3/04* (2006.01)
*G01L 7/16* (2006.01)

(52) U.S. Cl.
CPC ..................... *G01L 7/166* (2013.01)

(58) Field of Classification Search
CPC .......................................... G01M 3/26
USPC ............................................. 73/40
See application file for complete search history.

(56) References Cited

U.S. PATENT DOCUMENTS 3,654,414 A * 4/1972 Kudlaty .................. 200/308

* cited by examiner

*Primary Examiner* — Hezron E Williams
*Assistant Examiner* — Mark A Shabman
(74) *Attorney, Agent, or Firm* — Ian C. Barras; Raymond G. Areaux; Carver, Darden, Koretzky, Tessier, Finn, Blossman & Areaux, LLC

(57) ABSTRACT

Exemplary embodiments provide a packing leak detection system for leaks or discharge of a volatile material which discharge into the environment is subject to regulation. The system contains a compressor apparatus including a compressor cylinder, a compressor piston, a compressor piston rod positioned in a packing case, wherein a volatile material being compressed by the compressor apparatus leaks from the packing case. Also provided is a leak detector sized and configured to detect and monitor leaks of the volatile material from the packing case. Methods of assessing leaks of a volatile material subject to environmental regulation are also provided.

10 Claims, 4 Drawing Sheets

PACKING LEAK DETECTION SYSTEM

BACKGROUND OF THE INVENTION

I. Field

The present invention relates to a system for monitoring and annunciating leakage of gas vapors and/or volatile material from a volatile material compressor.

II. Background

A volatile material (gas) compressor is a pressure vessel in which a piston, moved by a compressor piston rod, compresses a volume of volatile material by decreasing the space in which the volatile material is contained. As the pressure increases, the higher pressure volatile material attempts to escape along the surface of the compressor piston rod and out of the compressor cylinder through the opening for the compressor piston rod. Packing material, which may take the form of a series of special rings, contained in a packing case, surrounds the compressor piston rod and impedes the volatile material from escaping into the environment.

When the packing material comprises rings, the efficiency of the rings is determined by several factors which include the conditions of the compressor piston, the compressor piston rod, the packing case and the rings, themselves. Wear of the packing rings is expected, and the timing of their replacement is crucial to efficient operation of the compressor apparatus and other compressor equipment.

We observe that regulatory requirements in the area of pollution prevention are becoming more and more stringent. Depending on the particular volatile material being compressed, for example, a volatile material (VOC) which may be regulated by the Environmental Protection Agency (EPA), leaks of escaping VOCs from a compressor apparatus can represent significant loss of revenue and could trigger possible environmental fines for the compressor operator.

Similarly, national emission standards for hazardous air pollutants (NESHAP) established pursuant to Section 112 of the Clean Air Act (as amended Nov. 15, 1990) regulate specific categories of stationary sources that emit (or have the potential to emit) one or more hazardous air pollutants (HAPs) (see generally Title 40 of the Code of Federal Regulations). Some examples of HAPs include formaldehyde, benzene, 1,3-butadiene, acrolein, acetaldehyde, and toluene (see larger illustrative list in Table 1). Similarly, a set of pollutants commonly referred to as "Criteria Pollutants" face regulatory scrutiny. These pollutants are generated by combustion and include Nitrous Oxides (NOx), Carbon Monoxide (CO) and Volatile Organic Compounds (VOCs). These compounds are regulated by the New Source Performance Standards (NSPS). A third set of regulated (or potentially soon-to-be regulated) gases are greenhouse gases (GHG), for example, methane and carbon dioxide.

TABLE 1

Illustrative List of Hazardous Air Pollutants.

| CAS Number | Chemical Name |
|---|---|
| 75070 | Acetaldehyde |
| 60355 | Acetamide |
| 75058 | Acetonitrile |
| 98862 | Acetophenone |
| 53963 | 2-Acetylaminofluorene |
| 107028 | Acrolein |
| 79061 | Acrylamide |
| 79107 | Acrylic acid |
| 107131 | Acrylonitrile |
| 107051 | Allyl chloride |
| 92671 | 4-Aminobiphenyl |
| 62533 | Aniline |
| 90040 | o-Anisidine |
| 1332214 | Asbestos |
| 71432 | Benzene (including benzene from gasoline) |
| 92875 | Benzidine |
| 98077 | Benzotrichloride |
| 100447 | Benzyl chloride |
| 92524 | Biphenyl |
| 117817 | Bis(2-ethylhexyl)phthalate (DEHP) |
| 542881 | Bis(chloromethyl)ether |
| 75252 | Bromoform |
| 106990 | 1,3-Butadiene |
| 156627 | Calcium cyanamide |
| 105602 | Caprolactam |
| 133062 | Captan |
| 63252 | Carbaryl |
| 75150 | Carbon disulfide |
| 56235 | Carbon tetrachloride |
| 463581 | Carbonyl sulfide |
| 120809 | Catechol |
| 133904 | Chloramben |
| 57749 | Chlordane |
| 7782505 | Chlorine |
| 79118 | Chloroacetic acid |
| 532274 | 2-Chloroacetophenone |
| 108907 | Chlorobenzene |
| 510156 | Chlorobenzilate |
| 67663 | Chloroform |
| 107302 | Chloromethyl methyl ether |
| 126998 | Chloroprene |
| 1319773 | Cresols/Cresylic acid (isomers and mixture) |
| 95487 | o-Cresol |
| 108394 | m-Cresol |
| 106445 | p-Cresol |
| 98828 | Cumene |
| 94757 | 2,4-D, salts and esters |
| 3547044 | DDE |
| 334883 | Diazomethane |
| 132649 | Dibenzofurans |
| 96128 | 1,2-Dibromo-3-chloropropane |
| 84742 | Dibutylphthalate |
| 106467 | 1,4-Dichlorobenzene(p) |
| 91941 | 3,3-Dichlorobenzidene |
| 111444 | Dichloroethyl ether (Bis(2-chloroethyl)ether) |
| 542756 | 1,3-Dichloropropene |
| 62737 | Dichlorvos |
| 111422 | Diethanolamine |
| 121697 | N,N-Dimethylaniline |
| 64675 | Diethyl sulfate |
| 119904 | 3,3-Dimethoxybenzidine |
| 60117 | Dimethyl aminoazobenzene |
| 119937 | 3,3'-Dimethyl benzidine |
| 79447 | Dimethyl carbamoyl chloride |
| 68122 | Dimethyl formamide |
| 57147 | 1,1-Dimethyl hydrazine |
| 131113 | Dimethyl phthalate |
| 77781 | Dimethyl sulfate |
| 534521 | 4,6-Dinitro-o-cresol, and salts |
| 51285 | 2,4-Dinitrophenol |
| 121142 | 2,4-Dinitrotoluene |
| 123911 | 1,4-Dioxane (1,4-Diethyleneoxide) |
| 122667 | 1,2-Diphenylhydrazine |
| 106898 | Epichlorohydrin (1-Chloro-2,3-epoxypropane) |
| 106887 | 1,2-Epoxybutane |
| 140885 | Ethyl acrylate |
| 100414 | Ethyl benzene |
| 51796 | Ethyl carbamate (Urethane) |
| 75003 | Ethyl chloride (Chloroethane) |
| 106934 | Ethylene dibromide (Dibromoethane) |
| 107062 | Ethylene dichloride (1,2-Dichloroethane) |
| 107211 | Ethylene glycol |
| 151564 | Ethylene imine (Aziridine) |
| 75218 | Ethylene oxide |

TABLE 1-continued

Illustrative List of Hazardous Air Pollutants.

| CAS Number | Chemical Name |
|---|---|
| 96457 | Ethylene thiourea |
| 75343 | Ethylidene dichloride (1,1-Dichloroethane) |
| 50000 | Formaldehyde |
| 76448 | Heptachlor |
| 118741 | Hexachlorobenzene |
| 87683 | Hexachlorobutadiene |
| 77474 | Hexachlorocyclopentadiene |
| 67721 | Hexachloroethane |
| 822060 | Hexamethylene-1,6-diisocyanate |
| 680319 | Hexamethylphosphoramide |
| 110543 | Hexane |
| 302012 | Hydrazine |
| 7647010 | Hydrochloric acid |
| 7664393 | Hydrogen fluoride (Hydrofluoric acid) |
| 7783064 | Hydrogen sulfide |
| 123319 | Hydroquinone |
| 78591 | Isophorone |
| 58899 | Lindane (all isomers) |
| 108316 | Maleic anhydride |
| 67561 | Methanol |
| 72435 | Methoxychlor |
| 74839 | Methyl bromide (Bromomethane) |
| 74873 | Methyl chloride (Chloromethane) |
| 71556 | Methyl chloroform (1,1,1-Trichloroethane) |
| 78933 | Methyl ethyl ketone (2-Butanone) |
| 60344 | Methyl hydrazine |
| 74884 | Methyl iodide (Iodomethane) |
| 108101 | Methyl isobutyl ketone (Hexone) |
| 624839 | Methyl isocyanate |
| 80626 | Methyl methacrylate |
| 1634044 | Methyl tert butyl ether |
| 101144 | 4,4-Methylene bis (2-chloroaniline) |
| 75092 | Methylene chloride (Dichloromethane) |
| 101688 | Methylene diphenyl diisocyanate (MDI) |
| 101779 | 4,4'-Methylenedianiline |
| 91203 | Naphthalene |
| 98953 | Nitrobenzene |
| 92933 | 4-Nitrobiphenyl |
| 100027 | 4-Nitrophenol |
| 79469 | 2-Nitropropane |
| 684935 | N-Nitroso-N-methylurea |
| 62759 | N-Nitrosodimethylamine |
| 59892 | N-Nitrosomorpholine |
| 56382 | Parathion |
| 82688 | Pentachloronitrobenzene (Quintobenzene) |
| 87865 | Pentachlorophenol |
| 108952 | Phenol |
| 106503 | p-Phenylenediamine |
| 75445 | Phosgene |
| 7803512 | Phosphine |
| 7723140 | Phosphorus |
| 85449 | Phthalic anhydride |
| 1336363 | Polychlorinated biphenyls (Aroclors) |
| 1120714 | 1,3-Propane sultone |
| 57578 | beta-Propiolactone |
| 123386 | Propionaldehyde |
| 114261 | Propoxur (Baygon) |
| 78875 | Propylene dichloride (1,2-Dichloropropane) |
| 75569 | Propylene oxide |
| 75558 | 1,2-Propylenimine (2-Methyl aziridine) |
| 91225 | Quinoline |
| 106514 | Quinone |
| 100425 | Styrene |
| 96093 | Styrene oxide |
| 1746016 | 2,3,7,8-Tetrachlorodibenzo-p-dioxin |
| 79345 | 1,1,2,2-Tetrachloroethane |
| 127184 | Tetrachloroethylene (Perchloroethylene) |
| 7550450 | Titanium tetrachloride |
| 108883 | Toluene |
| 95807 | 2,4-Toluene diamine |
| 584849 | 2,4-Toluene diisocyanate |
| 95534 | o-Toluidine |
| 8001352 | Toxaphene (chlorinated camphene) |
| 120821 | 1,2,4-Trichlorobenzene |
| 79005 | 1,1,2-Trichloroethane |
| 79016 | Trichloroethylene |
| 95954 | 2,4,5-Trichlorophenol |
| 88062 | 2,4,6-Trichlorophenol |
| 121448 | Triethylamine |
| 1582098 | Trifluralin |
| 540841 | 2,2,4-Trimethylpentane |
| 108054 | Vinyl acetate |
| 593602 | Vinyl bromide |
| 75014 | Vinyl chloride |
| 75354 | Vinylidene chloride (1,1-Dichloroethylene) |
| 1330207 | Xylenes (isomers and mixture) |
| 95476 | o-Xylenes |
| 108383 | m-Xylenes |
| 106423 | p-Xylenes |
| 0 | Antimony Compounds |
| 0 | Arsenic Compounds (inorganic including arsine) |
| 0 | Beryllium Compounds |
| 0 | Cadmium Compounds |
| 0 | Chromium Compounds |
| 0 | Cobalt Compounds |
| 0 | Coke Oven Emissions |
| 0 | Cyanide Compounds[1] |
| 0 | Glycol ethers[2] |
| 0 | Lead Compounds |
| 0 | Manganese Compounds |
| 0 | Mercury Compounds |
| 0 | Fine mineral fibers[3] |
| 0 | Nickel Compounds |
| 0 | Polycylic Organic Matter[4] |
| 0 | Radionuclides (including radon)[5] |
| 0 | Selenium Compounds |

NOTE:
For all listings above which contain the word "compounds" and for glycol ethers, the following applies: Unless otherwise specified, these listings are defined as including any unique chemical substance that contains the named chemical (i.e., antimony, arsenic, etc.) as part of that chemical's infrastructure.
[1]X'CN where X = H' or any other group where a formal dissociation may occur. For example KCN or Ca(CN)2
[2]Includes mono- and di- ethers of ethylene glycol, diethylene glycol, and triethylene glycol R—(OCH2CH2)n—OR' where: n = 1, 2, or 3 R = alkyl or aryl groups R' = R, H, or groups which, when removed, yield glycol ethers with the structure: R—(OCH2CH)n—OH. Polymers are excluded from the glycol category.
[3]Includes mineral fiber emissions from facilities manufacturing or processing glass, rock, or slag fibers (or other mineral derived fibers) of average diameter 1 micrometer or less.
[4]Includes organic compounds with more than one benzene ring, and which have a boiling point greater than or equal to 100° C.
[5]A type of atom which spontaneously undergoes radioactive decay.

A business that fails to monitor and take appropriate action to correct leaks of volatile organic compounds (VOCs), hazardous air pollutants (HAPs), Criteria Pollutants or greenhouse gases (GHGs) is taking a risk of having their operating permits suspended in addition to the possibility of incurring significant fines. As used herein, the term "volatile material" includes, without limitation, VOCs, HAPs, Criteria Pollutants and GHGs.

In addition to regulatory concerns, we speculate that the lost revenue of escaping VOCs and other volatile materials at the site of compression of these gases is a significant incentive to monitor compressor equipment to enable quick repair or replacement of compressor equipment in the event of detected volatile material leaks.

Currently within the industry, we have sometimes observed that the decision by the compressor operator regarding the timing of maintenance is left to either audible detection of volatile material leaks or physical detection of escaping gas by placement of the operator's hand on the compressor apparatus (to detect the stream of the escaping volatile material). Thus, there is a continuing need for a system that can reliably monitor and annunciate emissions of equipment, such as compressors of volatile materials such as VOCs.

SUMMARY OF THE INVENTION

In view of the aforementioned problems, it is an object of the present invention to provide a system for detecting, monitoring and annunciating volatile material leaks comprising a compressor apparatus sized and configured to compress a volatile material. The apparatus, adapted for use in a compressor, comprises a compressor cylinder containing a central space, a compressor piston, sized and configured to be slidably engaged within said central space, a compressor piston rod, attached to said compressor piston, which compressor piston rod moves through a packing case when said apparatus is in operation, and a leak detector sized and configured to detect and monitor leaks of said volatile material from said packing case. The detector comprises a housing containing a cavity in fluid communication with said packing case and with said volatile material within said packing case, a detector piston, sized and configured to be slidably engaged within said cavity and which detector piston moves within said cavity in response to increased pressure of said volatile material received from said packing case, a spring positioned within said cavity proximate to a head area of said detector piston which spring is sized and configured to be compressed by movement of said detector piston, and a pin positioned within said cavity proximate to said spring, which pin is capable of being forced to partially extend from said housing when said increased pressure overcomes resistance of said spring.

The system further comprises a pressure transducer in fluid communication with a transducer port of said cavity, which pressure transducer is sized and configured to electrically respond to changes in pressure of said volatile material received into said cavity.

Exemplary embodiments of the invention include providing a system which comprises a compressor cylinder containing a central space, a compressor piston slidably engaged within said central space, a compressor piston rod attached to said compressor piston, a packing case seated on said piston rod and contained in said central space, a detector housing with a cavity, an inlet port, an outlet port and a detector pin port, said inlet port opening into said cavity where said inlet port is in fluid communication with an interior of said packing case, a detector piston slidably engaged in said cavity with an inlet side head and a detector pin head, a pin slidably engaged within said cavity with a first end adjacent to said detector pin head and a distal end slidably engaged in said detector pin port, a spring springingly seated on said pin between said detector pin head and said detector pin port, and an outlet port in said detector housing wherein said outlet port is open or closed to said cavity with sliding of said detector piston. Said embodiment may further comprise a pressure transducer in fluid communication with a transducer port of said cavity.

Exemplary embodiments of the invention also include providing a system for observing discharge of a volatile material subject to government regulation of discharge into the environment. The system comprises a compressor for compressing said volatile material. The compressor comprises a compressor cylinder, a compressor piston, a compressor piston rod and packing material which packing material is capable of allowing discharge of said volatile material over time. The system also comprises a volatile material discharge detector which comprises a housing containing a cavity in fluid communication with said packing material and a detector piston which moves within said cavity as an amount of discharged volatile material from said packing material increases in said cavity, and an alert pin which extends from said housing when an amount of volatile material is present in said detector cylinder The detector further comprises a spring sized and configured to permit incremental movement of said alert pin out of said housing so that a portion of said alert pin is visible when said amount of volatile material applies force to a head area of said detector piston thereby compressing said spring.

The system further comprises a pressure transducer in fluid communication with said cavity, which pressure transducer is sized and configured to issue electrical responses to changes in pressure of said discharged volatile material received into said cavity. Said electrical responses of said pressure transducer may be analog electrical signals or digital electrical signals.

In an embodiment of the invention said electrical responses of said pressure transducer are collected and stored in a computer. Said collected electrical responses may be analyzed by a computer program in said computer thereby predicting a need to repair or replace said packing material in order to decrease said discharge of said volatile material. It is speculated that said computer program would allow an operator to identify trends in the data collected by correlating gas pressure measurements made by said transducer with lost volume of gas from said compressor apparatus, thus allowing said operator to predict the optimal time to schedule a repair of said compressor apparatus.

Another exemplary embodiment of the invention provides a detector comprising a housing containing a cavity configured to receive and discharge volatile material received from an external source, a detector piston slidably engaged within said cavity which detector piston moves within said cavity in response to a pressure of said volatile material received from said external source, a spring positioned within said cavity which spring is compressed by sliding movement of said detector piston, and a pin which travels in said cavity proximate to said spring, which pin is capable of being forced to partially extend from said housing when said increased pressure overcomes resistance of said spring. Said embodiment may further comprise a pressure transducer in fluid communication with a transducer port of said cavity.

Another embodiment of the invention includes a method for assessing leaks of a volatile material subject to regulation of said leaks into the environment, which method comprises: providing a fluid connection between a volatile material compressor apparatus, capable of having a leak of said volatile material, and a volatile material leak detector; allowing transfer of a leaked amount of said volatile material from said compressor apparatus to said detector; and observing a change to said detector caused by said transfer.

The above and other objects and features of the present invention will become apparent from the drawings, the description given herein, and the appended claims.

For a further understanding of the nature and objects of the present invention, reference should be had to the following description taken in conjunction with appended claims and with the accompanying drawings in which like parts are given like reference numerals.

Figure 1:
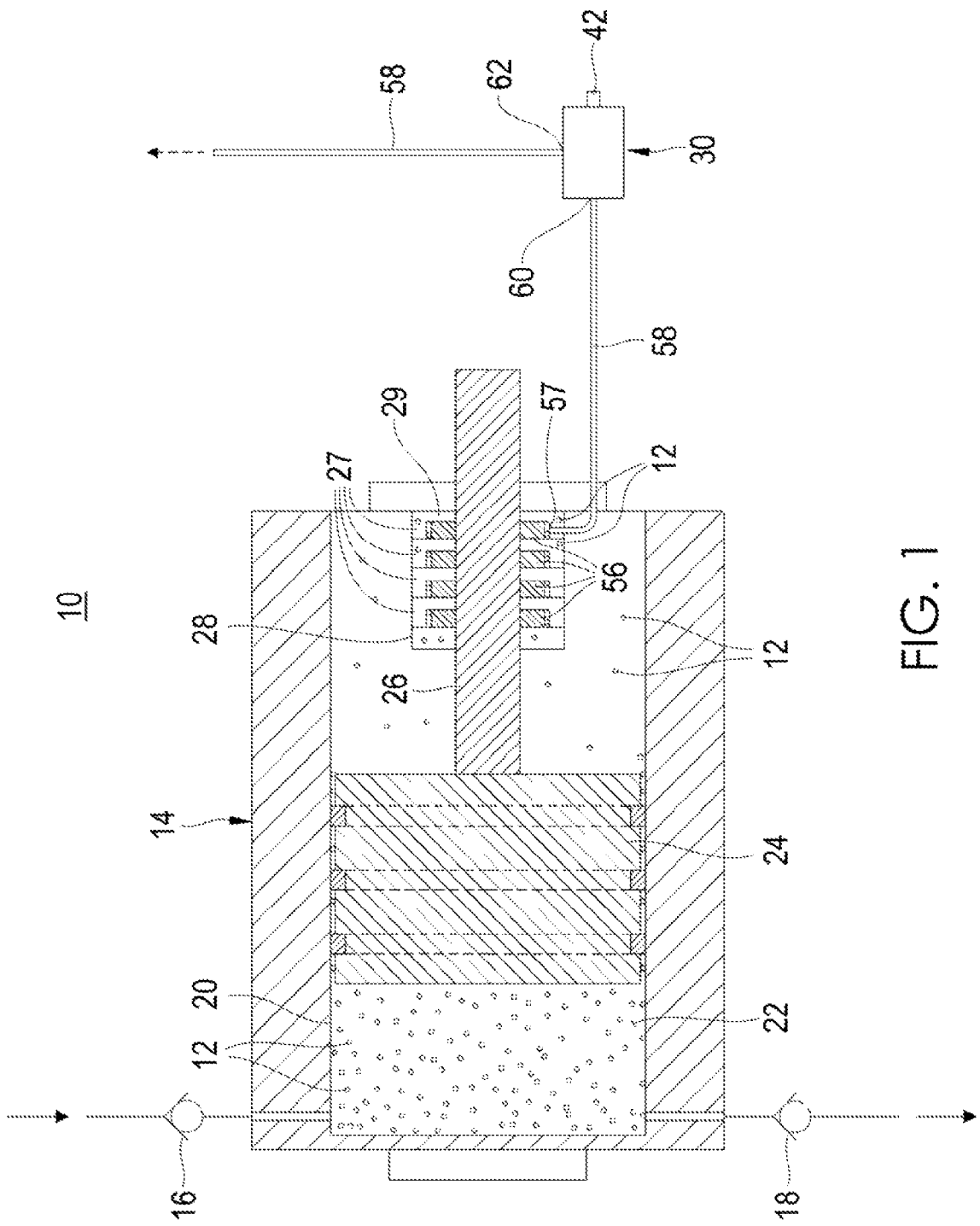
FIG. 1 illustrates a side cross-sectional view of a compressor apparatus and a side plan view of a packing leak detector (PLD) in accordance with some exemplary embodiments of the present invention.

The images in the drawings are simplified for illustrative purposes and are not depicted to scale. Within the descriptions of the figures, similar elements are provided similar names and reference numerals as those of the previous figure(s). The specific numerals assigned to the elements are provided solely to aid in the description and are not meant to imply any limitations (structural or functional) on the invention.

The appended drawings illustrate exemplary configurations of the invention and, as such, should not be considered as limiting the scope of the invention that may admit to other equally effective configurations. It is contemplated that features of one configuration may be beneficially incorporated in other configurations without further recitation.

DETAILED DESCRIPTION OF THE INVENTION

Turning now to the Figures, FIG. 1 illustrates an exemplary embodiment of a packing leak detection system 10 for detecting, monitoring and annunciating volatile material or volatile organic material (VOC) 12 leaks from compressor apparatus 14. As seen in cross-section in FIG. 1, volatile material 12 is brought into compressor cylinder 20 through a compressor inlet valve 16, where volatile material 12 is compressed and exits through a compressor outlet valve 18. Compression of volatile material 12 within a central space 22 of compressor cylinder 20 is accomplished by the sliding movement of a compressor piston 24 which is slidably engaged with central space 22. As a consequence of the physical configuration and constraints of compressor piston 24, a certain amount of volatile material 12 moves past compressor piston 24 and enters the area of compressor cylinder 20 proximate to compressor piston rod 26 upon each repetitive motion of compressor piston 24. Power to operate compressor apparatus 14 is supplied to compressor piston rod 26 from an external power source (not shown).

A portion of compressor piston rod 26 is surrounded by a packing case 28 near where compressor piston rod 26 extends from compressor cylinder 20. Compressor piston rod 26 moves through packing case 28 when compressor apparatus 14 is in operation.

In the exemplary embodiment of FIG. 1, packing case 28 is comprised of a plurality of sub-compartments 27 in series along the length of compressor piston rod 26, where each said sub-compartment 27 contains at least one packing ring 56 which is sized and configured to prevent movement of volatile material 12 out of compressor cylinder 20 and into the environment. The final sub-compartment 29 is the sub-compartment located closest to the exterior wall of compressor cylinder 20 and includes a vent 57 such that any volatile material which gets past the plurality of sub-compartments 27 (and the packing rings 56 therein), as well as the packing ring 56 inside of final sub-compartment 29, is collected into tubing 58 via vent 57. Each packing ring 56 is constructed from a softer, more wearable material than that of the compressor piston rod 26. The phrase "more wearable" means that under similar conditions of use, one material would wear away at a greater rate that of the comparison material. In an alternative embodiment (not shown), packing case 28 may comprise a single housing surrounding compressor piston rod 26 containing one or more packing rings 56.

FIG. 1 also shows tubing 58 forming a path allowing fluid communication between the interior of packing case 28 and a packing leak detector (PLD) or discharge detector 30. While a detailed description of packing leak detector 30 will be provided in discussion of FIGS. 2-5, a pin or alert pin 42 can be seen extending from packing leak detector 30. Additional tubing 58, shown extending from packing leak detector 30 at outlet port 62, and serves to direct volatile material 12 to a collection and/or disposal site.

Figure 2:
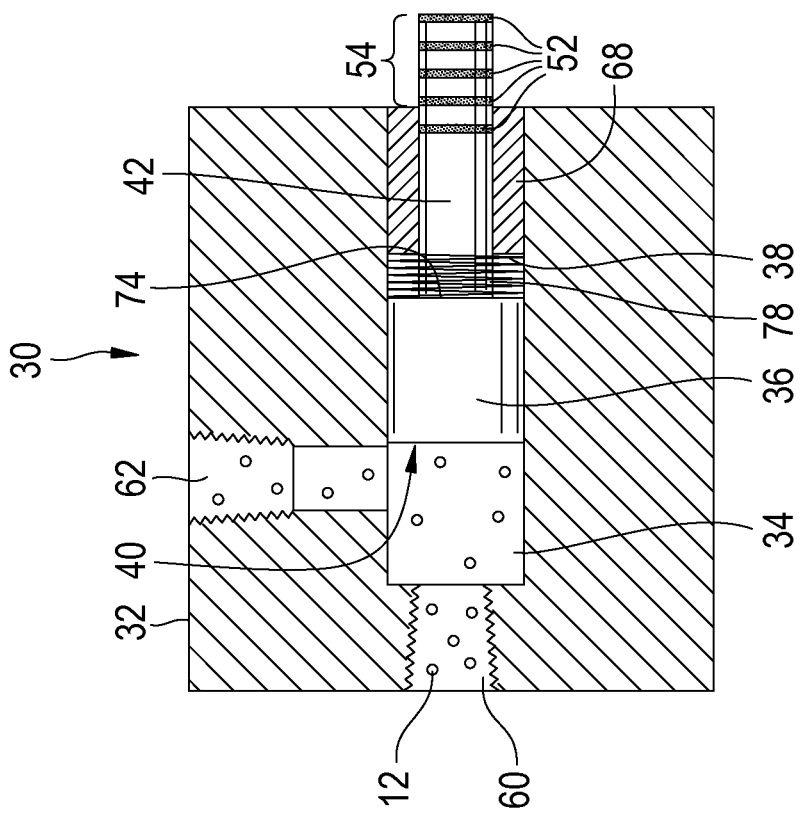
FIG. 2 illustrates a cross-sectional side view of a packing leak detector (PLD) in a closed position in accordance with some exemplary embodiments of the present invention.

In an embodiment of the invention depicted in FIG. 2, a cross-sectional view of leak detector or discharge detector 30 may be seen. Volatile material 12, which has escaped from packing case 28 of compressor apparatus 14 (seen in FIG. 1), is directed by fluid communication through tubing 58, having National Pipe Thread (NPT) fittings (also shown in FIG. 1), into a cavity 34 of housing 32 of leak detector 30. In an exemplary embodiment of the present invention, housing 32 is comprised of two machined pieces of type 306 or type 316 stainless steel held together either via welding or epoxy. In an alternative embodiment, housing 32 can be comprised of two machined pieces of aluminum or of two pieces of hard engineered plastic or of any other durable, corrosion-resistant material.

Housing 32 defines an inlet port 60 which opens into cavity 34 and which has NPT threads to receive threaded tubing (not shown). A detector piston 36 is slidably engaged in cavity 34 and is forced away from inlet port 60 as pressure from entering volatile material 12 increases. Housing 32 also defines an outlet port 62 which opens to cavity 34 depending on the sliding travel position of detector piston 36 (described below). Outlet port 62 has NPT threads to receive threaded tubing (not shown). In an exemplary embodiment, inlet port 60 and outlet port 62 are 0.5 inches in diameter; in an alternative embodiment, said ports are 0.25 inches in diameter.

It is speculated that the amount of discharged volatile material 12 coming from leaking packing case 28 is directly proportional to the degree of wear of packing ring or packing material 56.

Detector piston 36 is adjacent to or integral with alert pin 42, said alert pin 42 arranged to travel in said cavity 34 and on a side of detector piston 36 opposite said inlet port 60. Thus, they may be of unitary construction. In an exemplary embodiment, detector piston 36 is made of Teflon. In an exemplary embodiment, alert pin 42 slides synchronously with detector piston 36. Pin 42 is slidably engaged within cavity 34 and has a first end 78 adjacent to detector pin head 74 of detector piston 36 and a distal end 80 slidably engaged in a detector port 72. A spring 38, sized and configured to offer resistance to movement of detector piston 36, is located around pin 42 at first end 78 of pin 42 and seated between detector piston 36 and a bushing 68 in cavity 34. Volatile material 12 presses against a head area or inlet side head 40 of detector piston 36 causing movement or sliding travel of detector piston 36 and detector pin head 74 and compressing spring 38. In an exemplary embodiment, spring 38 has an R value of 1 lb per inch; however, the R value of spring 38 may be adjusted to a desired R value to meet an acceptable lost volume of volatile material. In an exemplary embodiment, spring 38 is made of a material resistant to corrosion by, and/or nonreactive with, VOCs and HAPs, for example, stainless steel or an alloy such as Inconel® sold by Special Metals Corp.

NPT threaded outlet port 62 provides an avenue for eventual removal of discharged volatile material 12. Threaded tubing 58 (best seen in FIG. 1) directs volatile material to a collection and/or disposal facility.

Figure 3:
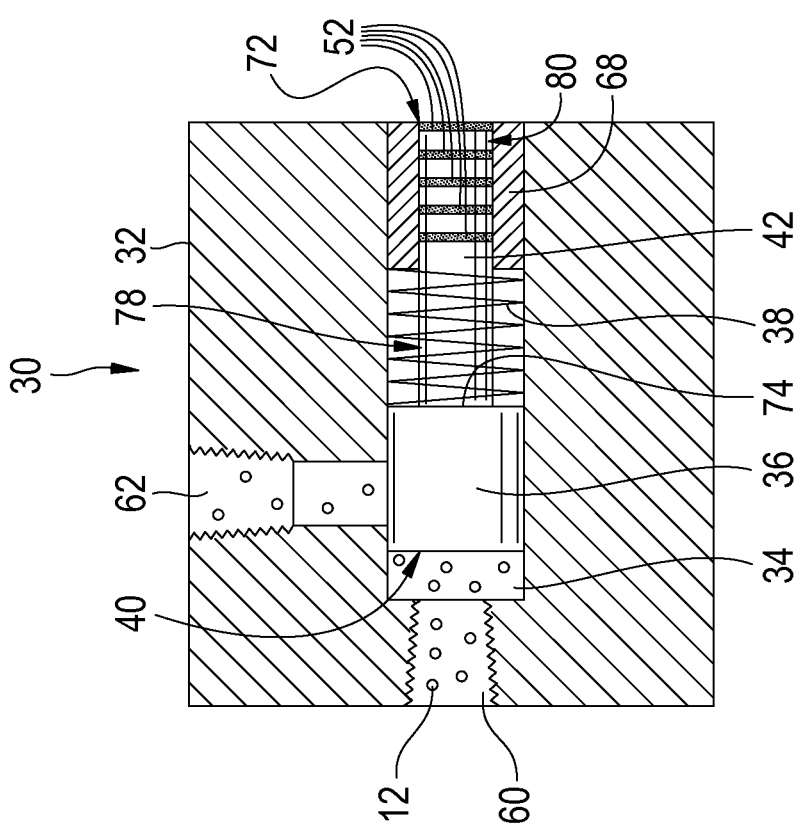
FIG. 3 illustrates a cross-sectional side view of a packing leak detector (PLD) in an open position in accordance with some exemplary embodiments of the present invention.

As may be seen in FIG. 3, when a pressure of volatile material 12 is sufficiently great, detector piston 36 moves, or sliding travels, and causes pin 42 to extend from housing 32 so that pin 42 is visible to an observer. A choice of spring 38 having suitable resistance properties allows calibration of leak detector 30 to quantify pressure variation of leaking volatile material necessary to cause pin 42 to incrementally extend a distance 54 from housing 32. Marks 52 on pin 42 become visible over time as the pressure of leaking volatile material increases and as pin 42 is forced further from housing 32.

Figure 4:
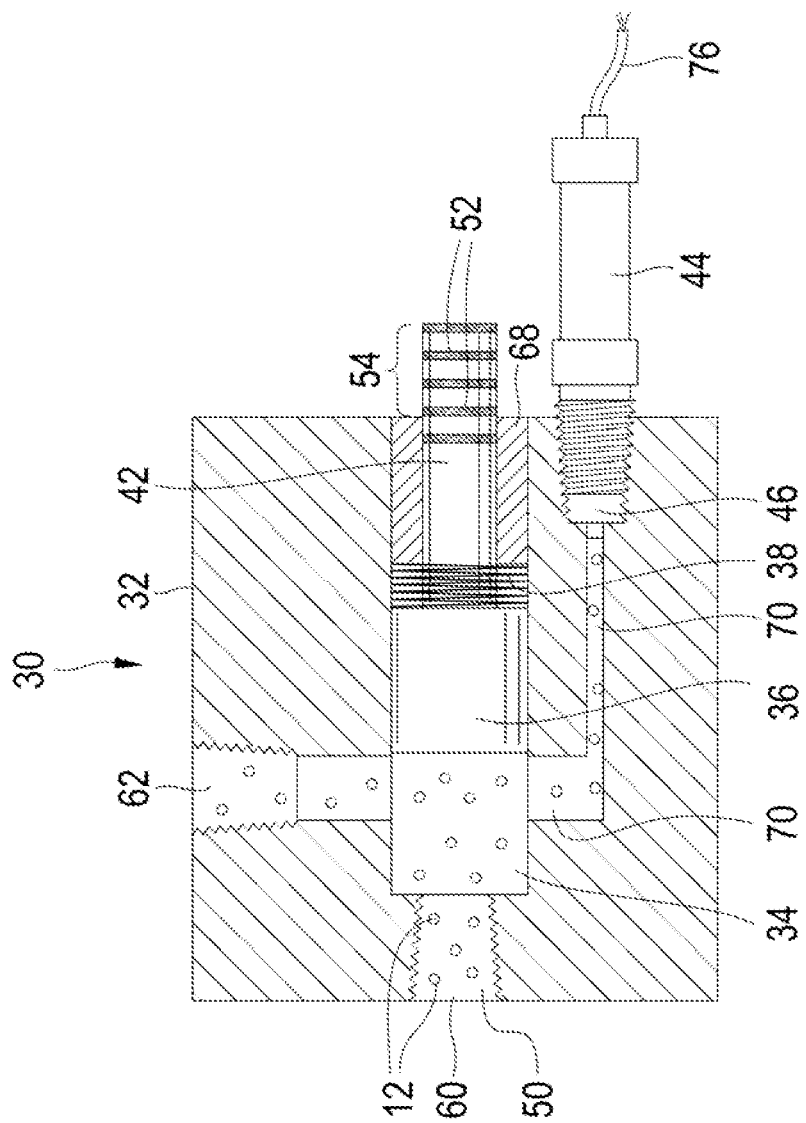
FIG. 4 illustrates a cross-sectional side view of a packing leak detector (PLD) which includes a pressure transducer in accordance with some exemplary embodiments of the present invention.

FIG. 4 illustrates an embodiment of the invention wherein leak detector 30 comprises an NPT threaded transducer port 46 within housing 32 and a pressure transducer 44 in fluid communication with pathway 50 by way of channel 70, where pathway 50 includes inlet port 60 and cavity 34. Pathway 50 maintains fluid communication between packing case 28 (best seen in FIG. 1) and cavity 34 of leak detector 30. Pressure build up of leaking volatile material 12, in addition to causing movement, or sliding travel, of detector piston 36, also acts on pressure transducer 44 causing it to emit electronic responses or electronic signals communicated via electrical conductor 76 (where electrical conductor 76 may be replaced by any data transmission medium, such as wireless transmitters/receivers, optical fiber, etc). The electronic signals can be either analog or digital electronic signals. The electronic signals can be transmitted off site to monitoring and analyzing equipment. The electronic signals can also be used to trigger one or more annunciation devices such as a lights or horns. The electronic signals may comprise a message to a computer system, or may trigger a message to be sent to a computer system. In an exemplary embodiment, pressure transducer 44 is a PT4300 pressure sensor sold by TURCK, Inc.

Figure 5:
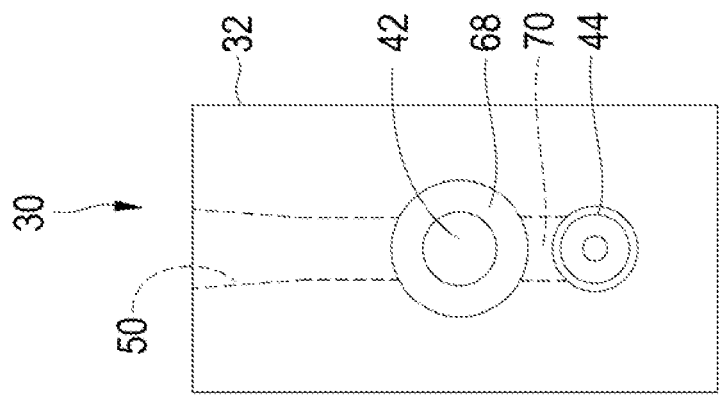
FIG. 5 illustrates an end, plan view of a packing leak detector in accordance with some exemplary embodiments of the present invention.

FIG. 5 depicts an embodiment of the invention as shown in an end, plan view. Leak detector 30 is shown to have a pathway 50 which permits passage of volatile material 12 which has leaked from compressor apparatus 14 (best seen in FIG. 1). Bushing 68 is visible surrounding pin 42. Pressure transducer 44 can be observed in fluid communication with pathway 50 by way of channel 70. Other instrumentation, such as hydraulic or pneumatic transducers or instrumentation, could be substituted for said pressure transducer 44.

Figure 6:
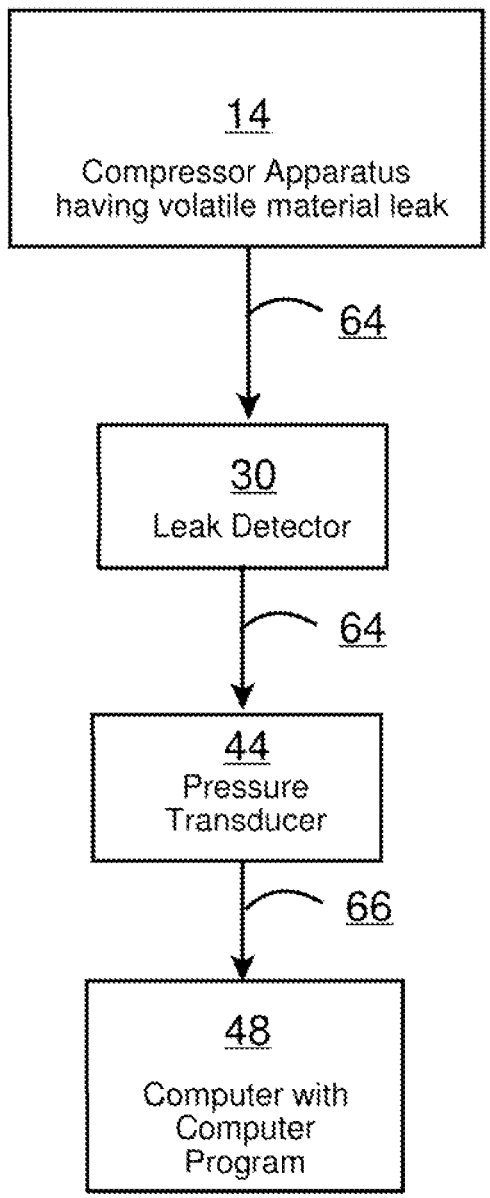
FIG. 6 illustrates a schematic view of a packing leak detection system in accordance with some exemplary embodiments of the present invention.

FIG. 6 is a schematic representation of an embodiment of the invention with system 10 having a compressor apparatus 14 in fluid communication 64 (for example, through tubing 58) with leak detector 30. A portion or amount of leaking volatile material from a packing case of compressor apparatus 14 will be transferred to leak detector 30 which is in fluid communication 64 with pressure transducer 44, sized and configured to generate electrical responses in the form of electrical signals when encountering a change in pressure and to audit the transfer of volatile material which these changes represent. Pressure transducer 44 is in electrical communication 66 (for example, via electrical conductor 76), either directly or indirectly, with a computer 48 which collects and stores received electrical signals from pressure transducer 44. Computer 48 contains one or more computer programs suitable to analyze the received and/or stored electrical signals and to generate statistical data related to the timing, degree and/or size of the pressure variations monitored and detected by leak detector 30. It is speculated that the data can be used to predict and optimize desirable maintenance programs for compressor apparatus 14.

One embodiment of the present invention is a method for assessing leaks of a volatile material subject to regulation of leaks into the environment. The method comprises providing a fluid connection between a volatile material compressor apparatus, capable of having a leak of said volatile material, and a volatile material leak detector; allowing transfer of a leaked amount of the volatile material from the compressor apparatus to the detector; and observing a change to the detector caused by the transfer.

The transfer of the amount of said volatile material is from a packing case of the compressor apparatus through connecting tubing to an inlet port of a housing of the detector. The packing case surrounds a compressor piston, and packing material interior to the packing case emits the transferred amount of the volatile material which passes through the tubing into the housing through a pathway.

The method further comprises placing a detector piston in the housing of the detector whereby the detector piston is displaced as the transferred amount of the volatile material passes though the pathway.

The method further comprises overcoming resistance of a spring within the housing, which spring is configured to retard movement of the detector piston.

The method further comprises forcing an alert pin out of the housing as the detector piston moves, which alert pin is positioned proximate to the detector piston and whereby a change in position of the alert pin can be visibly observed.

The method further comprises calibrating the alert pin with marks to permit visual perception of a distance the alert pin is forced out of the housing.

The method further comprises auditing the transfer by aligning a pressure transducer in fluid communication with the pathway and monitoring electronic signals emitted by the pressure transducer in response to changes in pressure within the pathway. The electronic signals are analog or digital signals.

The method further comprises collecting and storing the electronic signals by a computer.

The method further comprises analyzing the electronic signals by a computer program of the computer and predicting, by said computer program, a need to repair or replace the compressor apparatus in order to decrease the leaks of the volatile material.

The method provides that the packing material, which surrounds a compressor piston rod, comprises at least one packing ring formed from a more wearable substance than that of the compressor piston rod such that wear to the at least one packing ring enables leaking of the volatile material from the packing case.

As used herein the phrase "in fluid communication with" signifies that some means of connecting the designated elements is employed, such as tubing, lines, conduit, pipes, manifolds or the like, as long as fluid can pass between the designated elements.

We speculate that the following Tables 2 and 3 point out the economic factors which come into play when assessing compressor equipment leaks of volatile materials. These tables were developed based on our speculation of natural gas (methane) pipeline compressor performance. Leak rates for both tables were calculated from EPA information and various psi ratings. These tables are meant to show an appreciation of the economic impact the claimed invention would have on the industry.

Table 2 relates to the breakeven point in months to replace packing in the pipeline compressors when the cost of natural gas is $4.00 per thousand cubic feet (mcf). The cost is broken down by size of compressor piston rod (rod) and includes parts and labor (P&L). Leak rates in standard cubic feet per hour (scfh) are given across the top of the table. The breakeven point or time in months to recoup the cost of repair of the packing is shown in italics. For example, if the cost of natural gas is $4.00 per thousand cubic feet, the compressor piston rod has a 2 inch diameter and the leak rate is 150 scfh, we speculate that the time in months to breakeven would be 0.7 months.

TABLE 2

Breakeven Point in Months to Replace Packing (in italics)

| Cost to Replace Packing | | Leak Rates in scfh | | | | | | | | | |
|---|---|---|---|---|---|---|---|---|---|---|---|
| @ $4.00/mcf (P&L) | | 60 | 70 | 80 | 90 | 100 | 150 | 200 | 300 | 500 | 900 |
| 1⅛" rod | $321.62 | 1.9 | 1.6 | 1.4 | 1.2 | 1.1 | 0.7 | 0.6 | 0.4 | 0.2 | 0.1 |
| 1½" rod | $328.13 | 1.9 | 1.6 | 1.4 | 1.3 | 1.1 | 0.8 | 0.6 | 0.4 | 0.2 | 0.1 |
| 2" rod | $297.66 | 1.7 | 1.5 | 1.3 | 1.1 | 1.0 | 0.7 | 0.5 | 0.3 | 0.2 | 0.1 |
| 2¼" rod | $307.82 | 1.8 | 1.5 | 1.3 | 1.2 | 1.1 | 0.7 | 0.5 | 0.4 | 0.2 | 0.1 |
| 2½" rod | $337.50 | 2.0 | 1.7 | 1.5 | 1.3 | 1.2 | 0.8 | 0.6 | 0.4 | 0.2 | 0.1 |

Table 3, below, relates to our speculation as to the months to pay for installing a packing leak detector (PLD) in line with the pipeline compressors when the cost of natural gas is $4.00 per thousand cubic feet (mcf). As in Table 2, the cost is broken down by size of compressor piston rod (rod) and includes parts and labor (P&L). Leak rates in standard cubic feet per hour (scfh) are given across the top of the table as calculated from available industry data as in Table 2. The estimated (our speculation) time in months to recoup the cost of installing the PLD is shown in italics. For example, if the cost of natural gas is $4.00 per thousand cubic feet, the compressor piston rod has a 2 inch diameter and the leak rate is 150 scfh, the estimated (our speculation) time in months to recoup the cost of installation would be 1.3 months.

TABLE 3

Months to pay for Installed Packing Leak Detector (PLD) (in italics)

| Cost of PLD @ $4.00/mcf | | Leak Rates in scfh | | | | | | | | | |
|---|---|---|---|---|---|---|---|---|---|---|---|
| With (P&L) | | 60 | 70 | 80 | 90 | 100 | 150 | 200 | 300 | 500 | 900 |
| 1⅛" rod | $545.00 | 3.2 | 2.7 | 2.4 | 2.1 | 1.9 | 1.3 | 0.9 | 0.6 | 0.4 | 0.2 |
| 1½" rod | $545.00 | 3.2 | 2.7 | 2.4 | 2.1 | 1.9 | 1.3 | 0.9 | 0.6 | 0.4 | 0.2 |
| 2" rod | $545.00 | 3.2 | 2.7 | 2.4 | 2.1 | 1.9 | 1.3 | 0.9 | 0.6 | 0.4 | 0.2 |
| 2¼" rod | $545.00 | 3.2 | 2.7 | 2.4 | 2.1 | 1.9 | 1.3 | 0.9 | 0.6 | 0.4 | 0.2 |
| 2½" rod | $545.00 | 3.2 | 2.7 | 2.4 | 2.1 | 1.9 | 1.3 | 0.9 | 0.6 | 0.4 | 0.2 |

The foregoing description of the embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated.

This invention is susceptible to considerable variation in its practice. Therefore the foregoing description is not intended to limit, and should not be construed as limiting, the invention to the particular exemplifications presented hereinabove. Rather, what is intended to be covered is as set forth in the ensuing claims and the equivalents thereof as permitted as a matter of law.

That which is claimed is:

1. A system comprising:
a compressor cylinder containing a central space;
a compressor piston slidably engaged within said central space;
a compressor piston rod, attached to said compressor piston;
a packing case seated on said piston rod and contained in said central space;
a detector housing with a cavity, an inlet port, an outlet port and a detector port, said inlet port opening into said cavity where said inlet port is in fluid communication with an interior of said packing case;
a detector piston slidably engaged in said cavity with an inlet side head and a detector pin head;
a pin slidably engaged within said cavity with a first end adjacent to said detector pin head and a distal end slidably engaged in said detector port;
a spring springingly seated on said pin between said detector pin head and said detector port; and
wherein a sliding of said detector piston opens or closes said outlet port to said cavity.

2. A system according to claim 1 further comprising a pressure transducer in fluid communication with a transducer port of said cavity.

3. A system according to claim 2 wherein electrical responses of said pressure transducer are analog electrical signals.

4. A system according to claim 2 wherein electrical responses of said pressure transducer are digital electrical signals.

5. A system according to claim 2 further comprising a computer, wherein electrical responses of said pressure transducer are collected and stored in said computer.

6. A system according to claim 5 wherein said collected electrical responses are analyzed by a computer program within said computer in order to predict a need to repair or replace said packing material or said compressor apparatus.

7. A system according to claim 1 wherein said system volatile material comprises a volatile material subject to regulation of discharge into the environment.

8. A system according to claim 1 wherein said pin comprises calibrated marks to permit visual perception of a distance said pin is forced to extend from said housing.

9. A system according to claim 1 wherein said packing case further comprises at least one packing ring formed from a more wearable substance than that of said compressor piston rod such that wear to said at least one packing ring enables leaks of said volatile material from said packing case.

10. A system according to claim 1 wherein said detector piston and said pin are of unitary construction.

* * * * *